(12) United States Patent
Spencer

(10) Patent No.: US 6,881,949 B2
(45) Date of Patent: Apr. 19, 2005

(54) METHOD AND SYSTEM FOR SYNCHRONIZING INFORMATION SPECIFIC TO A LOCATION ON A SURFACE WITH AN EXTERNAL SOURCE

(76) Inventor: Charles A. Spencer, 998 Dover Way, Norcross, GA (US) 30093

( * ) Notice: Subject to any disclaimer, the term of this patent is extended or adjusted under 35 U.S.C. 154(b) by 65 days.

(21) Appl. No.: 10/291,534

(22) Filed: Nov. 12, 2002

(65) Prior Publication Data

US 2004/0089795 A1 May 13, 2004

(51) Int. Cl.$^7$ ................................................ G01D 5/34
(52) U.S. Cl. ............................ 250/231.13; 369/33.01; 84/604
(58) Field of Search ..................... 250/231.13, 221; 369/33.01; 84/604–607

(56) References Cited

U.S. PATENT DOCUMENTS

| | | | | |
|---|---|---|---|---|
| 4,416,006 A | * | 11/1983 | Kitamura et al. | 369/240 |
| 4,823,807 A | * | 4/1989 | Russell et al. | 600/586 |
| 5,644,139 A | | 7/1997 | Allen et al. | 250/557 |
| 5,915,288 A | | 6/1999 | Gabriel | 84/609 |
| 5,994,710 A | | 11/1999 | Knee et al. | 250/557 |
| 6,118,132 A | | 9/2000 | Tullis | 250/559.39 |
| 6,473,519 B1 | * | 10/2002 | Pidhirny et al. | 382/140 |

FOREIGN PATENT DOCUMENTS

| WO | WO 01/65559 A1 | 2/2000 |
|---|---|---|
| WO | WO 01/65559 A1 | 9/2001 |

OTHER PUBLICATIONS

Scott Sterling, "Final Scratch:/Media and Press"; Stanton Magnetics.com, Apr. 12, 2002, 6 pages.
International Search Authority, International Search Report, PCT/US03/35687, Jul. 9, 2004.

* cited by examiner

Primary Examiner—Thanh X. Luu
(74) Attorney, Agent, or Firm—McKenna Long & Aldridge LLP

(57) ABSTRACT

An apparatus including sensors that aid in the location of a stylus within the groove of a rotating record. The location of the stylus corresponds to a portion of an audio waveform present at a unique location within the groove. Using the correspondence between the location of the stylus and the portion of the audio waveform, an external digital source may be synchronized with an analog waveform. A high speed digital data path connects a control unit including a turntable platter to signal processing unit. Software in the signal processing unit synchronizes the analog waveform and digital signals from the external digital source.

22 Claims, 5 Drawing Sheets

METHOD AND SYSTEM FOR
SYNCHRONIZING INFORMATION
SPECIFIC TO A LOCATION ON A SURFACE
WITH AN EXTERNAL SOURCE

BACKGROUND OF THE INVENTION

1. Field of the Invention

The present invention relates to a system and method for detecting a location on a surface selected by a user and manipulating a digital source based on information relative to the detected location.

2. Discussion of the Related Art

Techniques used by disk jockeys (DJs) to manipulate analog devices have become almost universal. The goal of such techniques typically involves the locking or synchronization of signals (e.g., audio, video, etc.) between at least two devices. By far, the most popular analog devices with DJs are analog record turntables capable of producing sound off of an analog vinyl record. Recently, compact disk (CD) players capable of producing digitized analog sound from CDs have gained acceptance and use by DJs. Manipulation, however, of CD players is not accomplished as easily as with conventional analog turntables.

Over the years, a number of techniques have been proposed to manipulate CD players as analog turntables are manipulated. One such technique involves the use of a time code, used to derive tracking information, embedded within a vinyl analog record. By "playing" the vinyl analog record with a conventional analog turntable, the time code embedded therein may be read and used to synch with an external digital sound source such as a CD player. In implementing this technique, however, latency is deleteriously introduced while the vinyl record is being played and when the conventional record player is being manipulated and the responsiveness of the system is degraded. Additionally, the analog time code embedded within the vinyl record may wear over time, thereby necessitating a costly replacement vinyl record. If the vinyl record is not replaced, erratic playing behavior will result. Lastly, when a regular vinyl record (a vinyl record having no time code embedded therein) is played using the aforementioned system, the DJ is no longer able to control and manipulate any digital sources (e.g., sound source).

It was this understanding and recognition of the problems with the conventional sound manipulation techniques that formed the impetus for the present invention.

SUMMARY OF THE INVENTION

Accordingly, the present invention is directed to method and system for synchronizing information specific to a location on a surface with an external source that substantially obviates one or more of the problems due to limitations and disadvantages of the related art.

An advantage of the present invention provides a user e.g., a DJ, with control over audio and video digital media via an analog control unit capable of playing existing vinyl records.

Another advantage of the present invention provides information related to a predetermined song to the user. This information allows the user to synch a vinyl record with a digital source a single time and store it for future use.

According to the principles of the present invention, tracking information is not provided from time code embedded within a vinyl record. Rather, tracking information may be computed from dimensional information obtained from a control unit. The dimensional information relates to the actual location of a stylus from an analog turntable within the groove of the vinyl record.

Accordingly the system of the present invention tracks minute and rapid movements of a stylus within a groove as well as any arbitrary location of where the stylus is vertically placed on an existing record. The present invention also adds stable control (fine tuning) to existing methods of manipulating digital sources via vinyl records. Additionally, a user may start playing an existing vinyl record at any point and not lose time waiting for time code to catch up and lock with external digital sources.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for synchronizing information specific to a location on a surface with a digital source includes a pin, a stylus pivotally coupled to the pin via an arm, the stylus being arranged a first predetermined distance from the stylus, a position encoder for generating position data related to a position of the arm, an analog signal source coupled to the stylus, the analog signal source capable of generating analog electrical signals related to the position of the arm, a signal processing unit for receiving digital signals, the position data, and the analog electrical signals, and outputting the digital signals, wherein the position data controls the output of the digital signals.

In another aspect of the present invention, a method of processing analog and digital signals includes generating an analog audio waveform, generating position data related to portions of the generated analog audio waveform, providing a digital signal, and outputting the digital signal based on the position data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
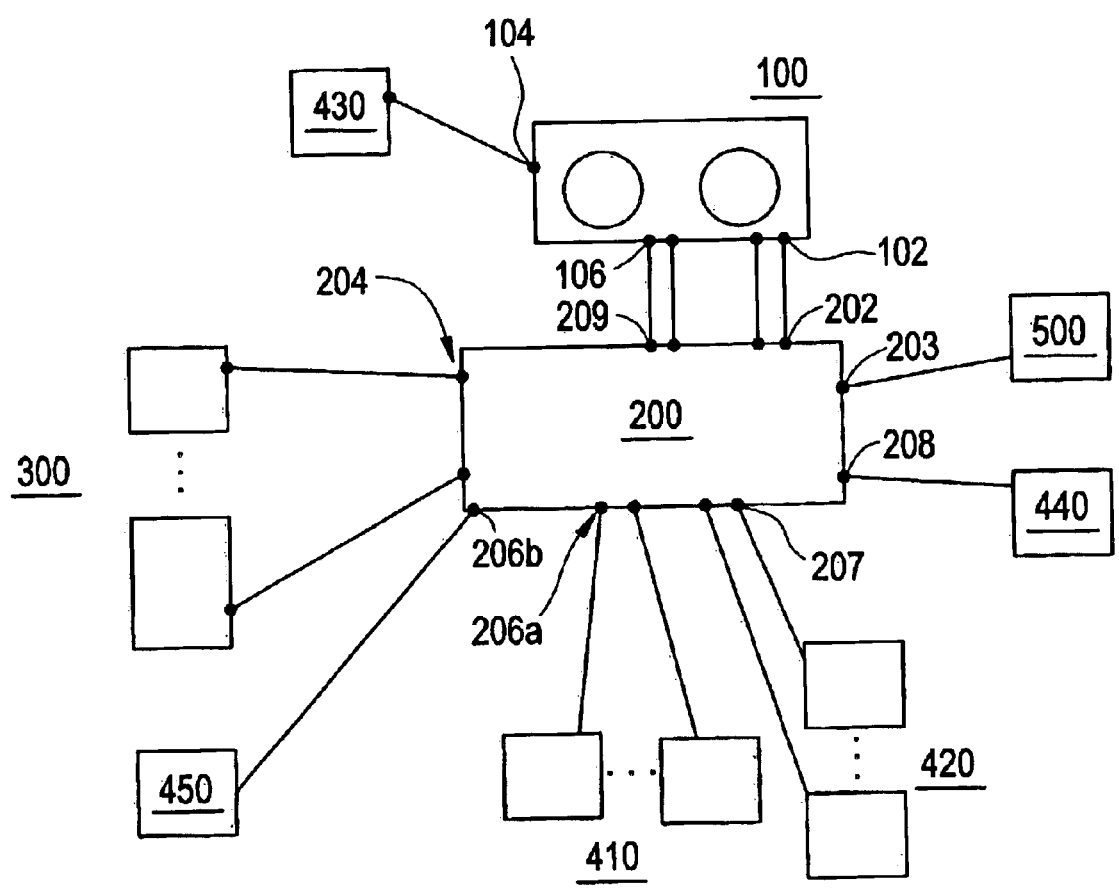
FIG. 1 illustrates an apparatus according to the principles of the present invention for synchronizing audio information specific to a location on a surface of a record.

FIG. 1 generally illustrates an apparatus for synchronizing audio information specific to a location on a surface of a record (e.g., a vinyl analog audio record) with at least one digital external data source and for outputting the synchronized information in synchrony with the at least one digital external data source.

In accordance with principles of the present invention, synchronization may be interpreted as the process of keeping two pieces of related program material locked together in time. Synchronization requires that signals produced by a master device control signals produced by a slave device. Accordingly, signals from the master device determine when and how fast signals from a slave device are to be outputted, wherein changes in the signals from the master device are reflected as changes in signals from the slave device.

Referring to FIG. 1, the master device may be characterized as a controller unit 100 coupled to at least one slave device such as an external digital data source 300 via a data processor unit 200.

In one aspect of the present invention, an audio waveform specific to a predetermined location on a record may be synchronized with signals from external digital data sources using the controller unit 100 and data processor unit 200 to determine the location of a stylus (e.g., needle) in a groove of a record, i.e., needle location. The data processor unit 200 may match the needle location to corresponding information related to a portion of a sampled audio waveform. The matched needle location may be associated with a portion of a digital signal of the external digital data source. Accordingly, sound from an analog record may be outputted in synchrony with a digital signal of at least one external digital data source.

In another aspect of the present invention, output ports 102 on the controller unit 100, e.g., a turntable unit, may be coupled to corresponding SCSI, USB, or other suitable type port 202 on the data processor unit 200 to communicate digitized audio signals and information useful in determining an intratrack needle position from the controlling unit 100 to the data processor unit 200. Analog audio output port 104 on the control unit 100 may be coupled to corresponding ports on external output device 430 such as a speaker to output audio signals synchronized with an audio signal corresponding to a location on a record. Communications ports, e.g., modem, serial, parallel, DSL, T1, etc., on the data processor unit 200 may be coupled to digital external data sources 300, e.g., devices containing digital audio or video information, to receive an output of at least one digital external data source. Video output port 206a on the data processor unit 200 may be coupled to corresponding ports on external output device 410 such as a video monitor to output video data synchronized with an audio signal corresponding to a location on a record. External output device 410 may either include a program video monitor for outputting the synchronized video data to an audience or to the user. Video output port 206b on the data processor unit 200 may be coupled to corresponding ports on external output device 450 such as a video monitor to output video data that, for example, has not been synchronized with the audio signal corresponding to the location on the record, or that has been synchronized but is not being viewed, or has not yet been viewed by an audience. Accordingly, the external output device 450 may be used by the user to view video data prior to its being synchronized with the audio signal. Digital audio output port 207 on the data processor unit 200 may be coupled to corresponding ports on external output device 420 such as a speaker to output audio signals synchronized with an audio signal corresponding to a location on a record. MIDI output port 208 on the data processor unit 200 may be coupled to a corresponding MIDI ports on digital recording or playback device 440 to record and/or play back the digital external data synchronized with the audio signal corresponding to a location on a record. Output ports 106 on the controller unit 100 may be coupled to corresponding mixer ports 209 on the data processor unit to communicate digitized mixing signals from the controlling unit to the data processor unit 200. Key pad port 203 may on the data processor unit 200 may be coupled to a keypad 500 for receiving signals from a keypad by a user. Signals from the keypad allow the user to operate the data processor unit 200.

In this aspect of the invention, the external output device 450 may be coupled to the data processor unit 200 and allow a user to view the audio waveforms of the sounds being played, the waveform of the external output, scan through optional external output selections while an external output selection is being used, and allow the user to perform various user functions. Additionally, the monitor may be touch sensitive and/or include buttons to allow for quick selections of programs, external output selections, etc.

Figure 2:
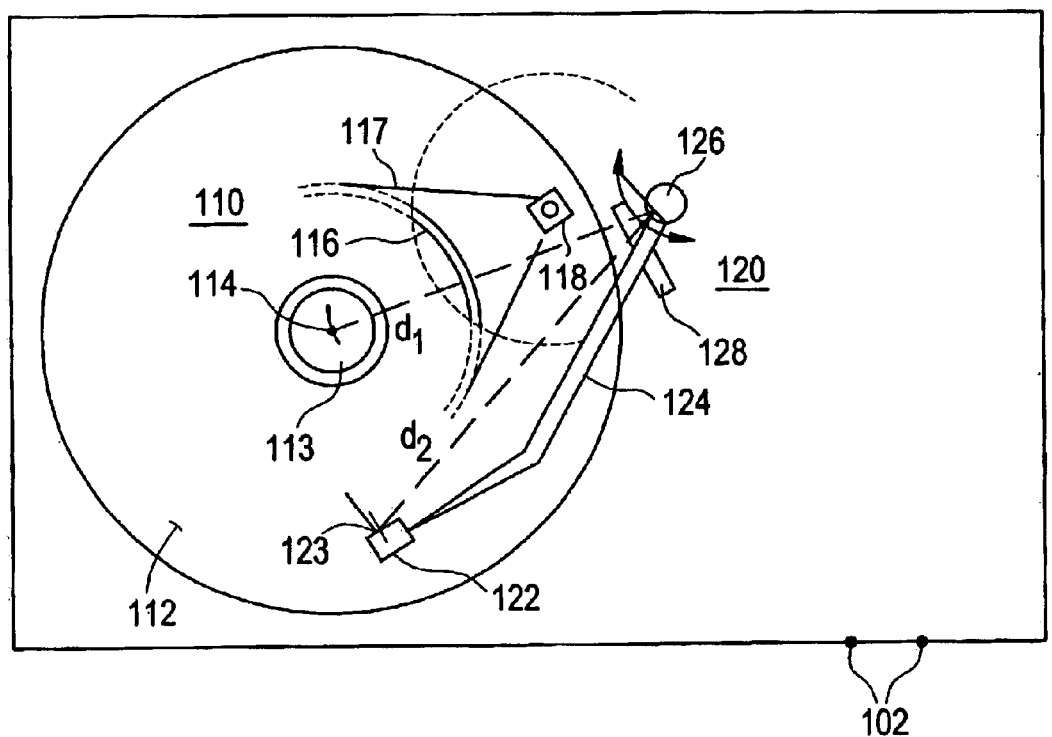
FIG. 2 illustrates a controller unit according to one embodiment of the present invention.

FIG. 2 illustrates a controller unit 100 according to one embodiment of the present invention.

Referring to FIG. 2, to synchronize output signals of digital external data sources with audio from an analog record, a needle location within the analog record must be determined. Accordingly, the controller unit 100 may include a turntable assembly 110, a tone arm assembly 120, and a scanner assembly, the various types of which are described in greater detail below.

In one embodiment of the present invention, turntable assembly 110 may include a turntable platter 112 having a supporting surface rotatable about a spindle 114. An existing record (not shown) may be arranged on the supporting surface of, and rotated by, the turntable platter 112. The turntable platter 112 may further include a center portion 113 having a recessed surface lying below the supporting surface to a predetermined depth.

In one aspect of the present invention, the turntable platter 112 may be provided as a belt driven turntable platter including a drive hub 116 integrally formed with, and extending downwardly from, the turntable platter 112. A drive shaft 118a included within a belt drive assembly 118 may be coupled to, and rotate, the turntable platter 112 via a drive belt 117. In another aspect of the present invention, the turntable platter 112 may provided as a electromagnetic, direct drive type turntable platter. Accordingly, by well known means, the turntable platter 112 may be coupled to, and rotated by, an electromagnetic drive assembly (not shown). Either the belt or direct drive assemblies may be used to rotate the turntable platter 112 clockwise or counter-clockwise in direction (e.g., via a signal communicated by a rotation direction switch (not shown) arranged within the controller unit).

In one embodiment of the present invention, tone arm assembly 120 may include a cartridge 122 pivotally coupled to the controller unit 100 via a tone arm 124 and tone arm pin 126. Tone arm pin 126 may, for example, include a stylus 123 and be arranged at a first predetermined distance, $d_1$, from the spindle 114. The stylus 123, capable of running within a groove on an existing analog record supported by the turntable platter 112 and sensing the groove topography may be arranged within the cartridge 122, may be positioned at a second predetermined distance, $d_2$, from the tone arm pin 126. The cartridge 122 generally includes at least one transducer for converting mechanical vibrations sensed by the stylus 123 into analog electrical signals. Further, the cartridge 122 communicates those analog electrical signals to the data processor unit 200 for sampling, as will be discussed in greater detail below.

A tone arm encoder 128 may be arranged on the controller unit 100 within an operable proximity of the tone arm 124 when the stylus 123 is arranged within the groove of the record. Accordingly, the position of the tone arm 124, relative to the tone arm encoder 128, may be detected by the tone arm encoder 128 via well known optical, magnetic, or mechanical methods.

In one aspect of the present embodiment, the tone arm encoder 128 may also detect, via well known mechanical, magnetic, or optical methods, when the tone arm 124, and thus the stylus 123, is at rest, i.e., when the stylus is physically off of the record. Accordingly, the tone arm encoder 128 may be used as a tone arm position trigger that generates a signal indicating the position of the tone arm 124, relative to the tone arm encoder 128, when the tone arm 124 is at rest (e.g., when the stylus is off of the record).

Tone arm assembly signals, i.e., signals indicating the position of the tone arm 124 relative to the tone arm encoder 128 for indicating the position of the stylus 123 on an analog record and signals indicating when the tone arm 124 is at rest, may be communicated from the tone arm encoder 128 to the data processor unit 200 via the output ports 102. The tone arm assembly signals may then be used by the data processor unit 200 to enable tracking of a stylus' progression through the groove of an existing record. The tone arm assembly signals may also be used to locate the point where the stylus initially contacts the record (i.e., drop point). Accordingly, a portion of an analog audio signal may be associated with a distance the stylus 123 has traveled from its rest position, as will be discussed in greater detail below.

Figure 3A:
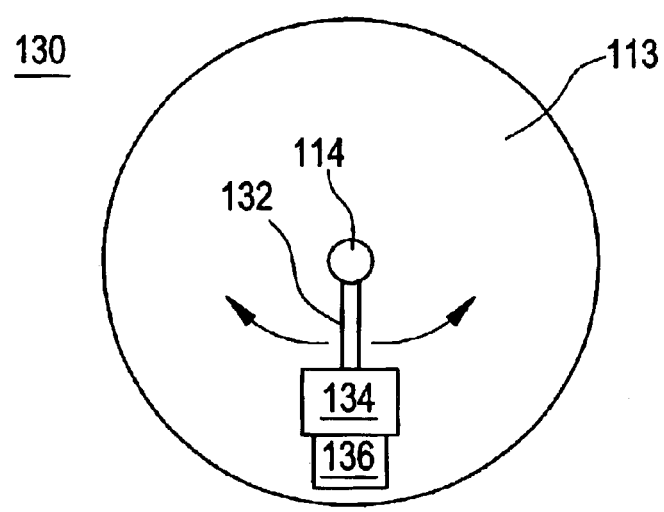
FIGS. 3A–3B illustrate a first scanner assembly in accordance with one embodiment of the present invention.
Figure 3B:
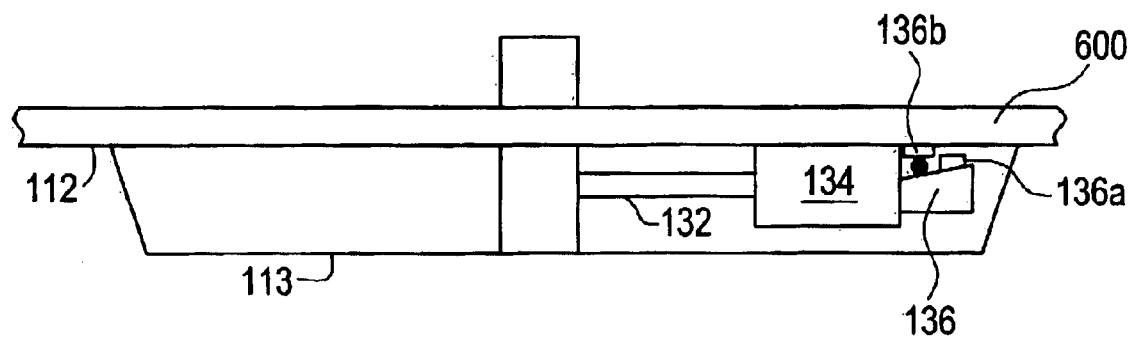

FIGS. 3A–3B illustrate a first scanner assembly in accordance with one embodiment of the present invention.

Referring to FIGS. 3A and 3B, first scanner assembly 130 may be arranged within the center portion 113 of the turntable platter 112. Further, the first scanner assembly 130 may be coupled, via a scanner arm 132, to spindle 114. The first scanner assembly 130 may include a rotational encoder 134 and a scanner 136.

Referring back to FIG. 3B, when a record 600 is arranged on the supporting surface of the turntable platter 112, the record contacts the proximity detector 136b of the scanner 136 and activates the scanning device 136a, thereby enabling the scanning device 136a of the scanner 136 to scan and detect identification information arranged on the record 600.

As shown in FIGS. 3A–3B, the rotational encoder 134 may include a roller made of soft plastic for contacting the recessed surface and an existing record 600 supported by the supporting surface of the turntable platter 112. The scanner 136 may, for example, include any of an optical scanner (e.g., LED, laser, etc.), or magnetic-type scanning device 136a capable of reading bar codes, magnetic strips, and the like, and a proximity detector 136b, e.g., a spring loaded switch, and the like.

Figure 3C:
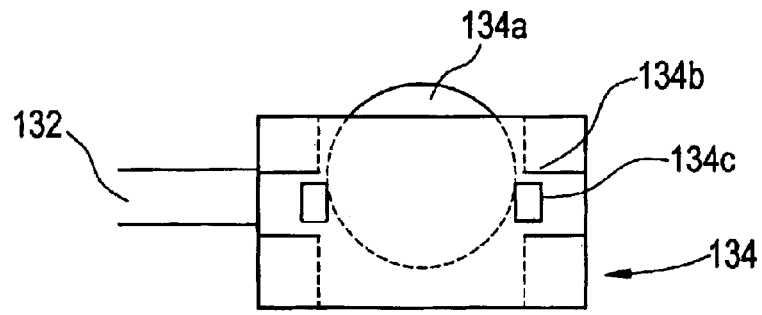
FIGS. 3C–3D illustrate a rotational encoders according to different embodiments of the present invention.

Referring to FIG. 3C, the rotational encoder 134 may comprise a roller 134a that is spherical in shape. The spherical roller 134a may, for example, be housed in a cylindrical roller housing 134b including at least one wheel 134c that contacts the equator of the spherical roller 134a and detects a speed and direction, i.e., velocity, at which the spherical roller is rotating. Accordingly, when an existing record 600 is placed on the turntable platter 112, an upper pole of the spherical roller 134a contacts the record.

Figure 3D:
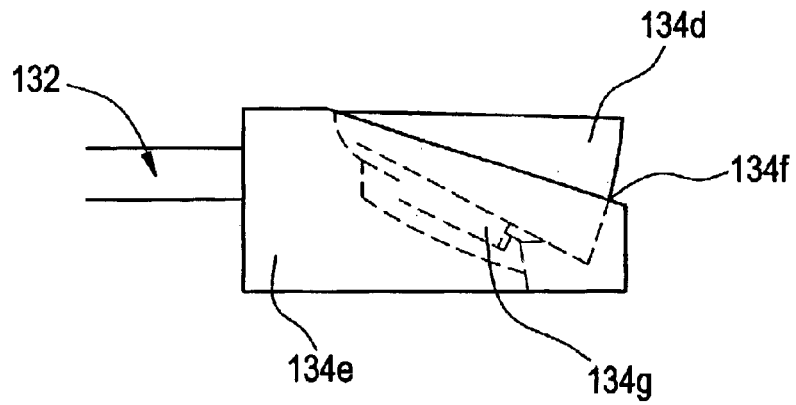

Referring to FIG. 3D, in another aspect of the present invention, the rotational encoder 134 may comprise a conical roller 134d rotatably connected to a wheel housing 134e via an axle 134f. The wheel housing 134e includes at least one wheel 134g that contacts a surface of the conical roller 134d and detects a velocity at which the conical roller is rotating. Accordingly, when a record 600 is placed on the turntable platter 112, an upper surface of the conical roller contacts the record.

In yet another aspect of the present invention, the rotational encoder 134 may also include a scanner, such as the scanner 136 described above. Accordingly, in the present aspect, the scanner 136 shown in FIGS. 3A and 3B may be removed and the rotational encoder 134 may be provided as an rotational identification scanner comprising an optical scanner (e.g., LED, laser, etc.), or magnetic-type scanning device capable of reading bar codes, magnetic strips, etc., in addition to being capable of measuring the instant rotational velocity (i.e., rotational speed and direction) of the record 600.

In one aspect of the present embodiment, the recessed surface of the center portion 113 of the turntable platter 112 rotates around the spindle 114. Accordingly, the spindle 114 and the first scanner assembly 130 remain in a fixed position such that rotational encoder 134 may be used to detect the instant rotational velocity of the record 600.

In another aspect of the present embodiment, the recessed surface of the center portion 113 does not rotate around the spindle 114. Accordingly, the spindle 114 and the scanner assembly may rotate in a direction opposite the rotational direction of the turntable platter 112 such that the rotational encoder 134 may be used to detect the instant rotational velocity of the record 600.

Instant rotational velocity signals, i.e., signals indicating the instant rotational velocity of a record on the supporting surface of the turntable platter 112, may be communicated from the rotational encoder 134 or the rotational identification scanner to the data processor unit 200 for use in determining the speed of the analog record relative to the stylus 123 when the turntable platter 112 is being rotated.

Identification signals, i.e., signals indicating the identity of the existing record being played, may be communicated from the scanner 136 or rotational identification scanner to the data processor unit 200 for use in identifying the dimensional characteristics of the analog record and synchronization information specific to the analog record being played, as will be discussed in greater detail below.

Label signals, i.e., signals identifying a portion of a groove within a radial segment on an actual analog record, may be generated by any of the aforementioned scanners (e.g., scanner 136, record scanner 146, rotational identification scanner) every time a label on arranged an analog record is arranged operably proximate the scanner, as will be discussed in greater detail below. Label signals are communicated to the data processor unit 200 and allow the data processor unit 200 to pinpoint the location of the stylus after it is initially arranged on the record, as will also be discussed in greater detail below.

Figure 4:
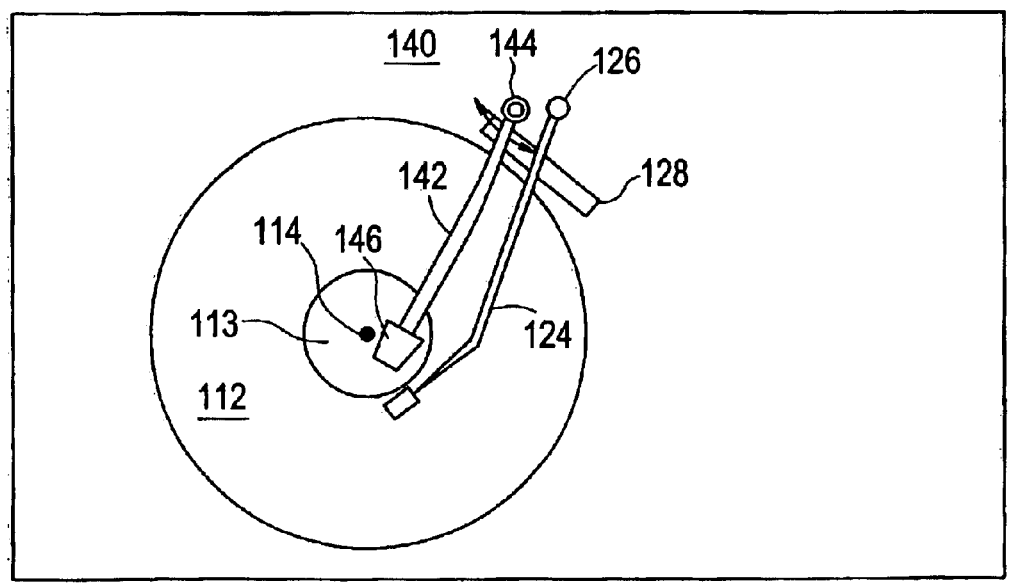
FIG. 4 illustrates a second scanner assembly in accordance with another embodiment of the present invention.

FIG. 4 illustrates a second scanner assembly in accordance with another embodiment of the present invention.

Referring to FIG. 4, a second scanner assembly 140 may include a record scanner 146. The second scanner assembly 140 may be pivotally coupled to the controller unit 100 via scanner arm 142 and hinge 144. The record scanner 146 may be provided as a rotational identification type scanner including an optical (e.g., LED, laser, etc.) scanner or a magnetic-type scanning device capable of reading bar codes, magnetic strips, and the like, and also capable of measuring the rotational velocity of the record. The hinge 144 allows the scanner arm 142 to be positioned over a record (not shown) such that the rotational scanner 146 may read a barcode, magnetic strip, etc., placed on a record while the record is supported by the turntable platter 112.

In the present embodiment, instant rotational velocity, identification, and label signals may be communicated from the record scanner 146 to the data processor unit 200 for use in determining the speed of the record relative to the stylus 123 when the turntable platter 112 is driven either directly by the user or by any of the aforementioned drive assemblies and in identifying the dimensional characteristics and synchronization information specific to the analog record being played, as will be discussed in greater detail below.

In one aspect of the present invention, the tone arm encoder, first scanner assembly, and/or the second scanner assembly may be provided as modular components that may be securely coupled, via well known means, to any controller unit and communicate relevant instant rotational velocity, tone arm assembly, and label signals to the data processor unit 200.

Figure 5:
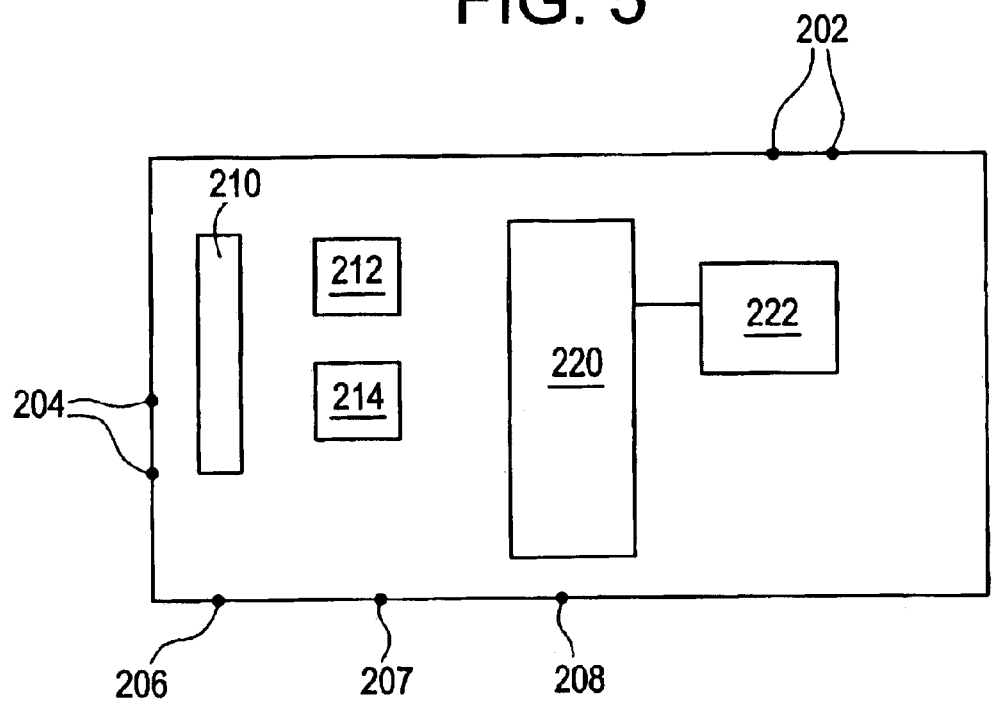
FIG. 5 illustrates a data processor unit in accordance with the principles of the present invention.

FIG. 5 illustrates a data processor unit 200 in accordance with the principles of the present invention.

Referring to FIG. 5, the data processor unit 200 may include a standard personal computer or a dedicated computer having at least one media drive 210, at least one memory unit 212, and a plurality of input and output ports capable of communicating with at least one of the controller unit 100, digital external data source 300, and the external devices 400. In one aspect of the present invention, the at least one media drive may include a digital video disk (DVD) drive, compact disk (CD ROM) drive, internal hard drive, portable hard drive, etc. In one aspect of the present invention, the at least one memory unit may include a random-access memory (RAM), dual RAM, read-only memory (ROM), EEPROM, etc. In one aspect of the present invention, the input and output ports include digital video outputs, monitor outputs, digital audio outputs, network communications connection (e.g., modem, DSL, T1, etc.), one or more SCSI or USB ports, or the like to communicate with one or more controller units. In one aspect of the present invention, the data processor unit 200 may also include a word clock processor 214 and a record database 220. Accordingly, the data processor unit 200 may store any DVD (or any other suitable video/audio format) into RAM (or ROM for faster selections), run multiple videos simultaneously, download videos, or store programs.

In one aspect of the invention, programs that may be stored within the data processor unit may include an automatic locator program, a waveform shaping program, a time filler program, and an anti-skip program. As will be discussed in greater detail below, the automatic locator program allows a user to locate where in the track of a song, or groove of analog record, the stylus is; the waveform shaper program allow a user to compare waveforms from external digital sources 300 (i.e., digital waveforms) and the controller unit 100 (i.e., analog waveforms), lock the two waveforms together, cue an output of the digital waveform after the analog audio waveform has been outputted for a predetermined amount of time, e.g., 30 seconds,; the time filler program provides either random or arbitrary video output to the audio waveform when there is no external output information for a record being played,; and the anti-skip program substitutes an audio signal from the controller unit 100 with an audio signal from a digital audio source synchronized with the controller unit. Accordingly, the anti-skip program allows a song from an analog record to remain being played when, for example, the stylus 123 of the controller unit skips, or jumps, the groove on the record.

Realizing that any record includes at least one side on which audio information is embedded, each side of a record may be uniquely identified and characterized by a unique set of database information. Accordingly, for each side of a record, the record database 220 includes database fields each containing database information related to, for example, identification information, bibliographic information, dimensional information, and external data information.

Identification information may, for example, be contained within a label (e.g., a bar code, magnetic strip, etc) that is readable by any of the aforementioned scanning devices. In one aspect of the present invention, the label may be arranged in a label area provided on an analog record. As will be discussed in greater detail below, the label provides the data processing unit 200 a basis with which to precisely locate the stylus after it is initially arranged within the groove of an analog record. Accordingly, the label helps to synchronize the output of an analog audio record with the output of an external digital data source.

Bibliographic information may, for example, include information related to the title of record and/or particular side of record, artist name, producer name, record company name, the revolutions per minute (RPM) at which the record is intended to be played, etc. Bibliographic information may be entered into the record database 220 by any known method via a user interface 222.

External data information may, for example, include information related to the name of an external data file, source of the external data file, e.g., digital external data source, digital/analog audio/video waveforms of the external data file, etc, that are to be synchronized with audio signals of an analog record.

Dimensional information may generally include information describing the topography of a groove (e.g., an analog waveform) found on a side of an existing analog record that is to be played.

Dimensional information may be obtained by realizing that each side of a record consists essentially of a single, spiraled groove having two sidewalls that are perpendicular to each other, wherein the sidewalls represent the two stereo channels on which sound is recorded and reproduced. Silence, the absence of pressure fluctuations in the air, is represented by a groove topography having smooth sidewalls. Moments of sound may be represented by a groove topography having ripples on its sidewalls. The amplitude and wavelength of the ripples determine the quality, e.g., the volume, pitch, etc., of the audio signals embedded within the vinyl record, the quality of the audio signals to be transmitted from the controller unit 100 to the data processor unit 200, and ultimately the quality of the audio signal transmitted to an external device, e.g., speakers, that reproduce the particular quality of sound as air pressure fluctuations. As the groove proceeds inward, toward the center of an analog record, the ripples in the sidewalls become compressed to compensate for a record surface speed differential that occurs as the stylus 123 progresses down the length of the groove, e.g., from an outer portion of the spiraled groove to an inner portion of the spiraled groove.

Figure 6:
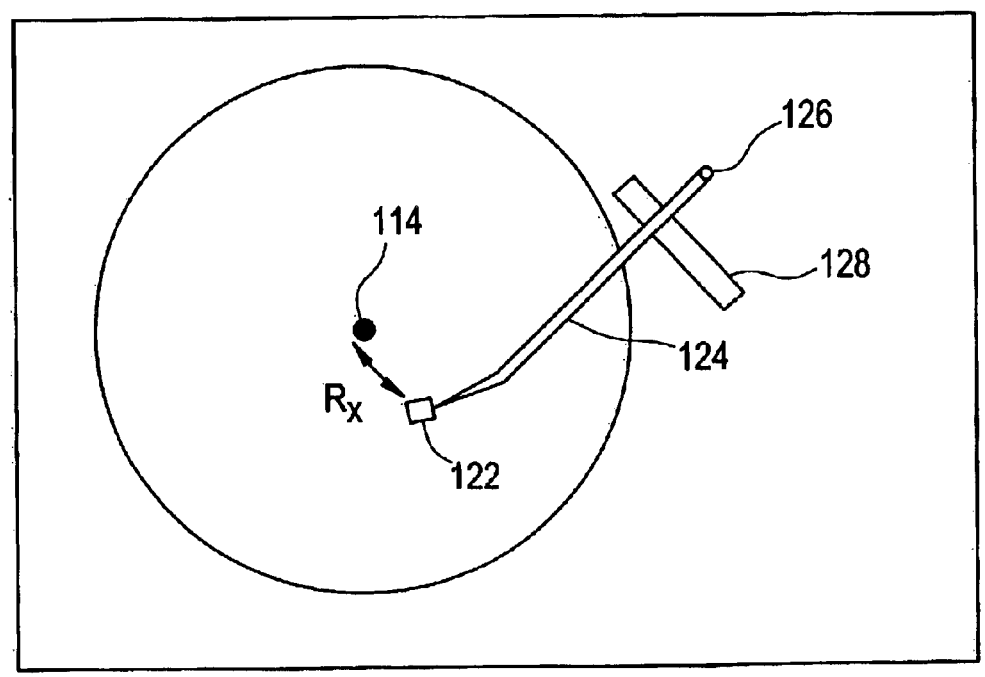
FIG. 6 illustrates a method by which dimensional information may be entered into the record database.

Accordingly, and referring to FIG. 6, dimensional information may be generated and stored within the record database by generating a waveform map of the analog record in a sampling process. Generally, generating the waveform map of a side of a record may be viewed as part of a pre-production step initiated by a user.

In generating the waveform map, the data processor 200 samples the analog audio waveform communicated from the controller unit 100 (e.g., the analog waveform) and correlates portions of the sampled analog waveform with corresponding values of the tone arm assembly signals, indicating the distance the stylus has traveled from its rest position. The waveform map may therefore be generated by first placing an existing record 600 onto the turntable platter 112, rotating the turntable platter 112, initializing the tone arm encoder when the stylus is in its rest position (e.g., off the record), removing the stylus 123 from its rest position, placing the stylus 123 onto a predetermined location on the rotating record (e.g., at the "beginning" of a song), sampling an analog audio waveform generated by the interaction of the stylus 123 with the groove sidewalls, and storing that sampled audio waveform in the record database. In one aspect of the present invention, initializing the tone arm encoder when the stylus is in its rest position communicates, to the data processor unit 200, a tone arm assembly signal indicating that the tone arm assembly, and therefore the stylus, is at a rest position (e.g., a 'zero' position). As discussed in greater detail below, all distances indicating the distance from which the stylus has traveled are based off of this rest position.

In one aspect of the present invention, as the stylus 123 progresses through the length of the groove, e.g., around the spiraled groove toward the center of the record during the sampling of the waveform, ripples within the sidewalls of the groove topography move past the stylus 123 at a decreasing speed (the linear, or tangential speed of a ripple within the groove is proportional to the stylus 123 radius times the speed at which the record is revolving), and data processor unit 200 may sample the audio waveform generated by the interaction of the stylus 123 and groove sidewalls at a progressively increased rate such that the analog audio waveform is sampled at an overall constant rate.

According to the principles of the present invention, the rate at which sampling of the audio waveform is progressively increased may be determined using information related to the needle location and the base sampling rate. More specifically, the rate at which the audio waveform is sampled is inversely proportional to the instant radial distance, r, of the stylus 123 from the spindle 114. Accordingly, the sampling rate of the audio waveform at any radial distance must be based off of a base sampling rate. Assuming the surface of the record is moving past the stylus 123 at the base turntable speed, the base sampling rate is the rate at which the data processor unit 200 generates the analog waveform.

In one aspect of the present invention, the base sampling rate may be obtained according to the revolutions per minute (RPM) the analog record should be rotated by. The RPM value may be entered directly into the data processor unit 200 by a user. In another aspect of the present invention, the base sampling rate may be obtained by measuring the RPM of the label with any of the aforementioned scanning devices. In yet another aspect of the present invention, the base sampling rate may be obtained by receiving signals from a pitch controller (not shown) that indicate the speed at which the turntable platter 112 is rotating. In still another aspect of the present invention, the base sampling rate may be obtained by directly measuring the RPM of the turntable platter 112 using a sensor coupled (e.g., optically, electronically, magnetically, mechanically, etc.) to the turntable platter 112.

According to the principles of the present invention, the instant radial distance, r, corresponds to the value of the tone arm assembly signals communicated form the tone arm encoder 128. Upon receipt of the tone arm assembly signals, the data processor unit 200 may determine, for example, information related to an instant angular position, θ, of the tone arm 124 with respect to a linear line segment found between the spindle 114 and the tone arm pin 126. Applying the rule of cosines, the data processor unit 200 may precisely determine the instant radial distance, r, and thus the sampling rate of the audio waveform as the stylus 123 progresses through the length of the groove. Accordingly, in sampling an analog audio record, an implicit correspondence between the distance the stylus has traveled from its rest position and a portion of the sampled analog audio waveform, specific to that distance traveled, may be stored in the waveform map.

In one aspect of the present invention, the location of any of the aforementioned scanners with respect to tone arm assembly measurements related to at least one of the distance traveled by the stylus (e.g., the arc length), the distance between the stylus and the tone arm pin, and the orientation of the arc with respect to the scanner of the tone arm 124 may be determined during the generation of the waveform map. In another aspect of the present invention, the aforementioned measurements may be communicated to the data processor unit 200.

In one aspect of the present invention, label signals generated during sampling of the analog audio record by any of the aforementioned scanners when the label is operably proximate the scanner. Every time the label is operably proximate the scanner (e.g., when, upon rotating, the label first becomes readable by the scanner) a label signal is communicated to the data processor unit 200 and label points are thus marked on the waveform map. Locations of label points on the waveform map correspond to the distance the stylus has traveled upon communication of each label signal and may facilitate locating the stylus within the groove of the analog record, as will be discussed in greater detail below. Accordingly, in sampling an analog audio signal from an analog record, an implicit correspondence based any of the aforementioned tone arm assembly measurements between the distance the stylus has traveled from its rest position and at least one label point may be generated within the waveform map.

After the waveform map is generated within the record database 220, synchronization information may be generated for the sampled analog audio waveform in a synchronization map.

In one aspect of the present invention, the synchronization map may be generated using the wave shaper program. Accordingly, the wave shaper program samples at least 2 portions (i.e., 'synchronization points') of the analog waveform in the waveform map in order to synchronize a digital output signal from an external digital source (e.g., video, audio, etc.) with the analog record and then marks those synchronization points on the waveform map. It should be noted, however, that the more synchronization points sampled from the analog waveform, the more precise the synchronization map, and thus synchronization of the analog and digital waveforms, will be.

Synchronization points from the analog waveform may then be marked on the waveform map and then matched to corresponding portions of an output from an external digital source (i.e., a digital waveform) such that the digital waveform may be synchronized with the analog waveform. In one aspect of the present invention, the matching may be performed either manually (e.g., user initiated) or automatically (e.g., processor initiated).

In manually matching the synchronization points of the analog waveform with corresponding portions of the digital waveform, a first synchronization point (i.e., a 'start point') on a portion (e.g., the beginning) of the analog waveform may be selected, marked on the waveform map, and matched with a corresponding portion of the digital waveform. Next, at least one succeeding synchronization point on the analog waveform is then selected, marked, and matched With Suitable corresponding portions of the digital waveform. In one aspect of the present invention, the process of matching synchronization points on the analog waveform to corresponding portions of a digital waveform may be repeated as many times as necessary depending on the number of digital waveforms that are to be synchronized with the analog waveform. In another aspect of the present invention, more than one 'starting point' and groups of succeeding synchronization points, may be selected if more than one analog waveform exists within the waveform map (e.g., if there is more than one track on the analog audio record).

In automatically matching the portions of the analog waveform with corresponding portions of the digital waveform, data processor unit 200 may calculate the beats per minute (BPM) of the digital waveform, sample, for example, the first two bars of the analog waveform, and match the sampled portion of the analog waveform with the calculated BPM of the digital waveform. Subsequently, the data processor unit 200 marks at least one starting point on the waveform map, and aligns that starting point with a corresponding portion of the digital waveform, calculates an appropriate end point of the analog and digital waveforms, and marks the end point on the waveform map.

In one aspect of the present invention, beat stamping may be performed so as to mark synchronization points on the analog waveform and digital waveform where beats of the two waveforms coincide.

In another aspect of the present invention, the analog record for which the waveform map is to be generated may be provided as a 'data given' record. A 'data given' record is a record that contains cueing information specific to a predetermined digital waveform. Accordingly, at least one synchronization point (e.g., the start point) on waveform map generated from a 'data given' record may be matched with corresponding portions of predetermined digital waveforms.

Generation of the synchronization map is complete when all of the synchronization points of a particular analog waveform have been matched with corresponding portions of the digital waveform(s) and marked on the waveform map. The completed synchronization map, essentially the marked waveform map without the actual waveform of the analog signal from the control unit 100, may then be stored in the data processor unit 200 and recalled when it is desirable to output digital waveforms in synchrony with the sampled analog record. Thus, the synchronization map, for a particular analog record, contains information describing the location of label points and synchronization points with respect to a distance traveled by the stylus from its rest position. Accordingly, for a particular analog record, the output of digital waveforms in synchrony with an analog waveform may be controlled according to label signals and the value of the tone arm assembly signals indicating the distance the stylus has traveled from its rest position, as will be discussed in greater detail below.

In one aspect of the present invention, the original waveform map may be deleted or stored within the record database 220 depending on whether the analog record is to be synchronized with additional digital waveforms in the future.

Once an analog record is processed, (e.g., labeled, sampled, analyzed, and marked to provide a basis with which to synchronize digital waveforms) it is possible to play that analog record in synchrony with the one or more external digital data sources for which the synchronization map has been generated, regardless of the rotational velocity of the analog record or the needle location.

In accordance with the principles of the present invention, the processed analog record may be played in synchrony with predetermined digital waveforms from external digital data sources either on the same controller unit that was used in sampling that analog record (i.e., an originating controller unit) or a different controller unit (i.e., a non-originating controller unit). Additionally, the data processor unit used in conjunction with the originating controller unit to sample, synchronize, etc., the various waveforms may herein be referred to as an originating data processor unit.

In one aspect of the present invention, the location of any of the aforementioned scanning devices with respect to any the aforementioned tone arm assembly measurements specific to the controller unit playing the processed record may be substantially identical to the location of the scanner with respect to the tone arm assembly during generation of the waveform map. In another aspect of the present invention, the location of any of the aforementioned scanning devices with respect to any of the tone arm assembly measurements specific to the controller unit playing the processed record may be different from the location of the scanner with respect to the tone arm assembly during generation of the waveform map. In yet another aspect of the present invention, the location of any of the aforementioned scanning devices with respect to tone arm assembly measurements specific to the controller unit playing the processed record may be correlated to the location of any of the aforementioned scanning devices with respect to the tone arm assembly measurements communicated during generation of the waveform map. Accordingly, the original spatial relationship between the scanning devices and the stylus present during generation of the waveform map may be preserved during the playing of a processed record. In one aspect of the present invention, the original spatial relationship may be determined using the spatial relationship between any of the aforementioned scanning devices and the stylus used during playing of the processed record.

In one aspect of the present invention, the controller unit 100 playing the processed record in synchrony with the predetermined digital waveforms may be an originating controller unit. Accordingly, the processed record may be arranged on the turntable platter 112 and caused to rotate. When the processed record rotates, instant rotational velocity signals and label signals are generated. When arranged operably proximate the labeled area of the record, the first or second scanner assemblies may scan the label such that identification information specific to the particular side of the analog record about to be played in synchrony with at least one predetermined digital waveform, ma be determined.

After a processed record is placed on the turntable platter 112, either the scanner 136 or the record scanner 146 may be arranged operably proximate the labeled area to determine the identification information of the analog record. It should be noted that, depending on which type of scanner (e.g., a scanner from either the first or second scanner assembly) is present, the label for a particular side of a record may be arranged on either the same or opposite side of the record that will actually contact the stylus 123. After determining the identification information, bibliographic information and the predetermined synchronization map is determined.

Subsequently, the tone arm encoder may be initialized, and the stylus may be arranged at any location within the groove of the processed record.

Upon initially arranging the stylus 123 within the groove, tone arm assembly signals indicating the position of the tone arm 124 relative to the tone arm encoder may be communicated to the data processor unit 200. However, the precise location of the stylus within the groove may not be determined until at least one label signal has been communicated to the data processor unit 200 and processed by the automatic locator program. By processing the tone arm assembly signals in view of the communicated label signals, the precise location of the stylus within the groove of a processed record may be determined.

If, for example, a stylus is arranged at any location within the groove of the processed record and is left to generate an analog audio signal as the processed record is left to rotate over time, the analog audio signal generated will be substantially identical to the analog waveform that provided the basis for the synchronization map of that analog record. Accordingly, predetermined digital waveforms, synchronized with the analog waveform, would be automatically synchronized via the data processor unit 200 with the generated analog audio signals.

However, if, for example, the stylus arranged within the groove of the processed record is manipulated (e.g., the turntable platter is "scratched", sped up, sped down, etc.) such that the analog audio signal generated is different from the analog waveform that provided the basis for the synchronization map, the data processor 200 may use the instant rotational velocity signals communicated by any of the aforementioned scanners to precisely determine the needle location on the record.

Accordingly, as the last known location of the stylus on the record is known, the last known distance the stylus has traveled from its rest position and therefore the active portions of the synchronization map , and the last known portions of the predetermined digital waveform being outputted are also known. Since the instant rotational velocity of the processed record just prior to the time of user manipulation is known, the velocity of the record surface at the needle location just before user manipulation is also known via information related to the stylus' distance from its rest position. Accordingly, as the velocity of the record is altered by the user, the data processor unit 200 may calculate the stylus' distance from its rest position and the needle location within the synchronization map may be determined. Therefore, using the instant rotational velocity signals, digital waveforms may outputted in synchrony with analog audio signals produced by a user-manipulated controller unit.

In another aspect of the present invention, the controller unit 100 playing the processed analog record in synchrony with the predetermined digital waveforms may be a non-originating unit. Accordingly, the originating data processor unit may be coupled to appropriate output ports within the non-originating controller unit. Analog audio signals of processed records may be outputted in synchrony with predetermined digital signals on non-originating controller units that may or may not include the aforementioned tone arm encoder and first or second scanner assemblies. If the non-originating controller unit does not include any tone arm encoder and scanner assemblies the missing components may be accordingly supplemented.

Subsequently, a calibration record (e.g., an analog record processed essentially in the manner as described above for which a synchronization map has already been created using an originating controller unit) may be arranged on a turntable of the non-originating controller unit and caused to rotate. When the calibration record rotates, instant rotational velocity signals and label signals are generated. When arranged operably proximate the labeled area of the record, the first or second scanner assemblies may scan the label such that identification information specific to the particular side of the calibration record is determined.

After the tone arm encoder is initialized and a stylus of the non-originating controller unit is arranged on the calibration record (e.g., the beginning of the calibration record), tone arm assembly signals and label signals are communicated and processed by the originating data processor unit 200. Using the communicated label and tone arm assembly signals, the originating data processor unit 200 generates a new set of label points measured against the distance the stylus has traveled from its rest position on the non-originating controller unit. Accordingly, a correspondence between the originating synchronization map of the calibration record and the non-originating synchronization map of the calibration record may be generated. For example, the relationship of the label points and the various distances traveled by the stylus, determined using the originating controller unit, may be correlated to the relationship of the label points and the various distances traveled by the stylus determined using the non-originating controller unit. This correlation may then be applied to any of the records processed by the originating controller unit that are to be played on the non-originating controller unit in synchrony with predetermined digital waveforms.

After the calibration record has been played on the non-originating controller unit and the correlation has been determined by the originating data processor unit, any analog audio signals from a processed record using the originating controller unit may be outputted in synchrony with predetermined digital waveforms using a non-originating controller unit.

It should be noted that all records may not have the same size holes, into which the spindle 114 may be inserted. For example, if a hole is too big, radial movement of the record may deleteriously destroy the correspondence between the needle location and the sampled analog audio waveform. In accordance with the principles of the present invention, the aforementioned scanners capable of detecting rotational velocity are able to send signals to the data processor unit 200 to compensate for any extraneous radial movement of a record being played, thereby preserving the correspondence between the needle location and the sampled analog audio waveform.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents for example, while identification information about each side of a record is provided as a label, readable by some type of scanning device, identification information about each record side may also be inputted directly into the data processor unit 200 by well known means.

What is claimed is:

1. An apparatus for synchronizing an analog audio waveform with a digital signal, comprising:
    a stylus for sensing a topography on a surface;
    an analog signal source for generating an analog electrical signal representative of the sensed topography;
    a position encoder for generating position data related to the location of the stylus on the surface;
    a signal processing unit for sampling the analog electrical signal at a rate corresponding to the position data and for controlling the output of an external digital signal based on the position data.

2. The apparatus for synchronizing an analog audio waveform with a digital signal according to claim 1, wherein the surface is a grooved surface.

3. The apparatus for synchronizing an analog audio waveform with a digital signal according to claim 1, further comprising:
    a pin;
    an arm, wherein the stylus is rotatably coupled to the pin via the arm.

4. The apparatus for synchronizing an analog audio waveform with a digital signal according to claim 1, further comprising:
    a spindle;
    a platter arranged about the spindle and under the topography, the platter capable of inducing a rotational velocity in the surface; and
    a velocity sensor, for determining the rotational velocity.

5. The apparatus for synchronizing an analog audio waveform with a digital signal according to claim 4, wherein the velocity sensor is coupled to the spindle.

6. The apparatus for synchronizing an analog audio waveform with a digital signal according to claim 4, wherein the velocity sensor is coupled to the platter.

7. The apparatus for synchronizing an analog audio waveform with a digital signal according to claim 4, wherein the velocity sensor comprises an optical scanner.

8. The apparatus for synchronizing an analog audio waveform with a digital signal according to claim 4, wherein the velocity sensor comprises a magnetic scanner.

9. The apparatus for synchronizing an analog audio waveform with a digital signal according to claim 4, wherein the velocity sensor comprises a roller assembly.

10. The apparatus for synchronizing an analog audio waveform with a digital signal according to claim 4, wherein the velocity sensor is arranged above the surface.

11. The apparatus for synchronizing an analog audio waveform with a digital signal according to claim 4, wherein the velocity sensor is arranged below the surface.

12. An apparatus for synchronizing information specific to a location on a surface with a digital source, comprising:
    a pin;
    a stylus pivotally coupled to the pin via an arm, the stylus being arranged a first predetermined distance from the pin;
    a position encoder for generating position data related to a position of the arm;
    an analog signal source coupled to the stylus, the analog signal source capable of generating analog electrical signals related to the position of the arm;
    a signal processing unit for receiving digital signals, the position data, and the analog electrical signals, and outputting the digital signals, wherein the position data controls the output of the digital signals.

13. The apparatus for synchronizing information specific to a location on a surface with a digital source, according to claim 12, further comprising:
    a spindle;
    a turntable platter rotatably arranged about the spindle; and
    a velocity sensor for generating rotational velocity data related to a rotational velocity of the turntable platter.

14. The apparatus for synchronizing information specific to a location on a surface with a digital source, according to claim 13, wherein the rotational velocity data is associated with the position data.

15. A modular signal processing system, comprising:
    a first transmitter capable of transmitting first signals indicating a position of a first object, wherein the first object has a first rotational axis;
    a second transmitter capable of transmitting second signals indicating a velocity of a second object, wherein the second object has a second rotational axis different from the first rotational axis;
    a third transmitter for transmitting third signals indicating the operable proximity of a third object, the third object being arranged on the second object;
    a data processing unit coupled to the first, second and third transmitters for sampling an analog waveform, and for correlating portions of the sampled analog waveform with the first, second, and third signals.

16. The modular signal processing system according to claim 15, wherein the first object includes a stylus.

17. The modular signal processing system according to claim 15, wherein the second object includes an analog record.

18. The modular signal processing system according to claim 15, wherein the second object includes turntable platter.

19. The modular signal processing system according to claim 15, wherein the third object includes a label.

20. The modular signal processing system according to claim 15, wherein the data processing unit correlates the portions of the sampled analog waveform with portions of a digital waveform.

21. A method of processing signals, comprising:
    storing first data representing an orientation of a first tone arm assembly over a predetermined area of an analog record;
    associating portions of an external digital waveform with the stored data;

generating second data representing an orientation of a second tone arm assembly over the predetermined area of the analog record;

correlating the second data to the first data; and outputting the associated portion of the external digital waveform, wherein the correlated second data controls the outputting.

22. The method of processing signals of claim 21, wherein:

the first tone arm assembly is comprised within a first analog source assembly that generates analog signals; and the second tone arm assembly is comprised within a second analog source assembly, different from the first analog source assembly, that generates analog signals.

* * * * *